United States Patent
Sinclair et al.

(10) Patent No.: US 6,772,163 B1
(45) Date of Patent: Aug. 3, 2004

(54) REDUCED MEMORY ROW HASH MATCH SCAN JOIN FOR A PARTITIONED DATABASE SYSTEM

(75) Inventors: Paul Laurence Sinclair, Manhattan Beach, CA (US); Kuorong Chiang, Cerritos, CA (US)

(73) Assignee: NCR Corporation, Dayton, OH (US)

( * ) Notice: Subject to any disclaimer, the term of this patent is extended or adjusted under 35 U.S.C. 154(b) by 370 days.

(21) Appl. No.: 10/029,082

(22) Filed: Dec. 20, 2001

(51) Int. Cl.[7] .................. G06F 7/00; G06F 15/167; G06F 12/00
(52) U.S. Cl. .................. 707/100; 709/215; 711/153
(58) Field of Search .................. 707/1–3, 7, 10, 707/100–101, 200, 205; 709/214, 215; 715/509–510; 711/100, 153

(56) References Cited

U.S. PATENT DOCUMENTS 5,794,229 A * 8/1998 French et al. .................. 707/2
6,073,129 A * 6/2000 Levine et al. .................. 707/4
6,366,911 B1 * 4/2002 Christy .................. 707/7

* cited by examiner

Primary Examiner—Alford Kindred
(74) Attorney, Agent, or Firm—Baker Botts LLP

(57) ABSTRACT

A method, computer system, and computer program are claimed for selecting rows from first and second tables each having rows containing values in columns. In at least the first table, the rows are divided into partitions at least one of which is populated by one or more rows. The method, computer system, and computer program include (a) defining a subset of the populated partitions of the first table that excludes at least one populated partition of the first table, (b) creating a file context, which stores at least location data for a row and a first value associated with the row, for each populated partition in the subset of the populated partitions of the first table, (c) determining the lowest first value stored by the file contexts for the first table, (d) identifying rows with a particular first value by at least reading the file contexts of the first table, and (e) repeating a through d until the subsets of the populated partitions of the first table have included all the populated partitions of the first table.

33 Claims, 10 Drawing Sheets

REDUCED MEMORY ROW HASH MATCH SCAN JOIN FOR A PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users in relational database systems require a minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, in responding to queries performance can be improved by taking advantage of that organization and searching only part of the data. If the data is not organized in any way, it will often need to be searched in its entirety to satisfy a query or copied and restructured into a useful organization.

Given a particular change in the organization of data, particular types of searches or other operations performed on the data may be adversely impacted in terms of efficiency if they are performed without any adjustment. Many factors must be addressed to adjust a search that is to be performed with respect to a new organization of data. Such factors include, but are not limited to, the manner in which the data is stored, the file system that identifies the location of the data and various other information about the data, and the desired outcome of the search. Failure to consider and address any one of those factors can result in an inefficient search.

SUMMARY

In general, in one aspect, the invention features a method for selecting rows from first and second tables each having rows containing values in columns. In at least the first table, the rows are divided into partitions at least one of which is populated by one or more rows. The method includes (a) defining a subset of the populated partitions of the first table that excludes at least one populated partition of the first table, (b) creating a file context, which stores at least location data for a row and a first value associated with the row, for each populated partition in the subset of the populated partitions of the first table, (c) determining the lowest first value stored by the file contexts for the first table, (d) identifying rows with a particular first value by at least reading the file contexts of the first table, and (e) repeating a through d until the subsets of the populated partitions of the first table have included all the populated partitions of the first table.

Implementations of the invention may include one or more of the following. Defining a subset may include calculating a total number of file contexts for both tables. The rows of the second table may be divided into partitions. The method may include (a') defining a subset of populated partitions of the second table, (b') creating a file context, which stores at least location data for a row and a first value associated with the row, for each populated partition in the subset of the populated partitions of the second table, (c') determining the lowest first value stored by the file contexts for the second table, (d') identifying rows with a particular first value by at least reading the file contexts of the second table, and (f) repeating a through e and a' through d' until the subsets of the populated partitions of the first table have included all the populated partitions of the first table, and where (e) may include repeating b through d and a' through d' until the subsets of the populated partitions of the second table have included all the populated partitions of the second table.

Creating a file context may include changing the location data and first value to correspond to a row in a different partition. Rows may be stored in order of their corresponding first value within the partitions. The first value corresponding to a row may be the result of a hash function applied to the values in one or more columns.

Defining a subset of the populated partitions of the first table may include (i) representing a total read time for the first and second tables in terms of a variable representing the number of partitions in a subset of the partitions of the first table, (ii) determining the rate of change in total read time in terms of the number of partitions in a subset, (iii) truncating the number of partitions for which the rate of change in total read time is zero, and (iv) increasing the number of partitions to one if truncation results in a value of zero. Defining a subset of the populated partitions of the first table may further include (v) if truncation results in a value greater than zero, determining whether the read cost for a subset including an additional partition is less than the read cost for the current number of partitions and increasing the number by one if the read cost with the additional partition is lower.

A number, f1, of populated partitions in a subset of the partitions of the first table may be determined in accordance with the equation $f1=(fT*R/(1+R))$ where $fT$ is a total number of file contexts for both tables and $R=\sqrt{(r2/r1)*(p1/p2)}$, where $r1$ and $r2$ represent a cost to read once through tables 1 and 2, respectively, and $p1$ and $p2$ represent the number of populated partitions of tables 1 and 2, respectively. Alternatively, R may be calculated using $R=\sqrt{(db2/db1)*(p1/p2)}$, where tables 1 and 2 require $db1$ and $db2$ data blocks of storage, respectively.

In general, in another aspect, the invention features a database system for iteratively selecting rows from a first table. The database system includes a second table. The first table includes rows and columns and is divided by rows into partitions. At least one of the partitions in the table is populated by one or more rows. The system includes one or more nodes, a plurality of CPUs, each of the one or more nodes providing access to one or more CPUs, and a plurality of processes, each of the one or more CPUs providing access to one or more virtual processes. Each process is configured to manage data, including the partitioned database table, stored in one of a plurality of data-storage facilities. A partitioned table access component is configured to select rows from at least the first table by (a) defining a subset of the populated partitions of the first table that excludes at least one populated partition of the first table, (b) creating a file context, which stores at least location data for a row and a first value associated with the row, for each populated partition in the subset of the populated partitions of the first table, (c) determining the lowest first value stored by the file contexts for the first table, (d) identifying rows with a particular first value by at least reading the file contexts of the first table, and (e) repeating (a) through (d) until the subsets of the populated partitions of the first table have included all the populated partitions of the first table.

In general, in another aspect, the invention features a computer program, stored in a tangible medium, for selecting rows from a first table. The first table has rows and columns and is divided by row into partitions. At least one of the partitions is populated by rows. The program includes executable instructions that cause a computer to (a) define a subset of the populated partitions of the first table that excludes at least one populated partition of the first table, (b) create a file context, which stores at least location data for a row and a first value associated with the row, for each populated partition in the subset of the populated partitions of the first table, (c) determine the lowest first value stored by the file contexts for the first table, (d) identify rows with a particular first value by at least reading the file contexts of the first table, and (e) repeating a through d until the subsets of the populated partitions of the first table have included all the populated partitions of the first table.

In general, in another aspect, the invention features a method for allocating a total number fT of file contexts between a number of file contexts f1 for a first table T1 having p1 populated partitions and a number of file contexts f2 for a second table T2 having p2 populated partitions. The method includes (a) calculating f1 to minimize the total read cost, (b) if f1 is not a whole number, truncating f1 to a whole number, (c) if f1 is zero, adding one to f1, (d) calculating f2 using the following equation: f2=fT−f1, (e) if f1 was truncated, determining whether the total read cost for f1 partitions of T1 and f2 partitions of T2 is greater than the total read cost for f1+1 partitions of T1 and f2−1 partitions of T2, and if it is, adding 1 to f1 and subtracting 1 from f2 (f) if f1>p1, setting f1 to p1 and setting f2 to the minimum of p2 and fT−p1, and (g) if f2>p2, setting f2 to p2 and setting f1 to the minimum of p1 and fT−p2.

Implementations of the invention may include one or more of the following. The calculation of f1 may be done in accordance with the following equation f1=(fT*R/(1+R)), where R=$\sqrt{(r2/r1)*(p1/p2)}$, where r1 and r2 represent a cost to read once through tables T1 and T2, respectively. Alternatively, R may be calculated using R=$\sqrt{(db2/db1)*(p1/p2)}$, where tables 1 and 2 require db1 and db2 data blocks of storage, respectively.

Other features and advantages will become apparent from the description and claims that follow.

DETAILED DESCRIPTION

Figure 1:
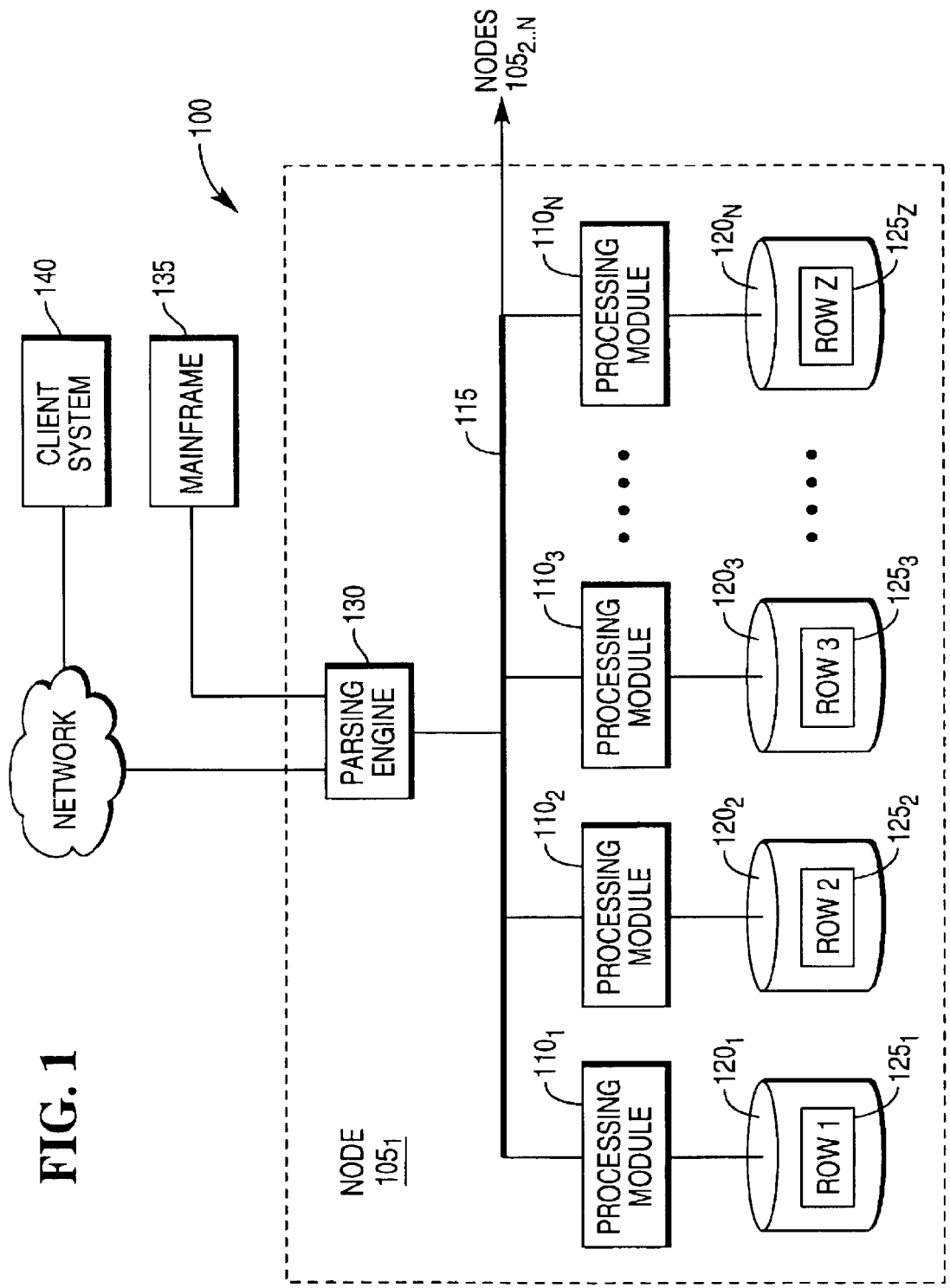
FIG. 1 is a block diagram of a node of a database system.

The partitioned table storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

The rows $125_{1 \ldots Z}$ are distributed across the data-storage facilities $120_{1 \ldots N}$ by the parsing engine 130 in accordance with their primary index. The primary index defines the one or more columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
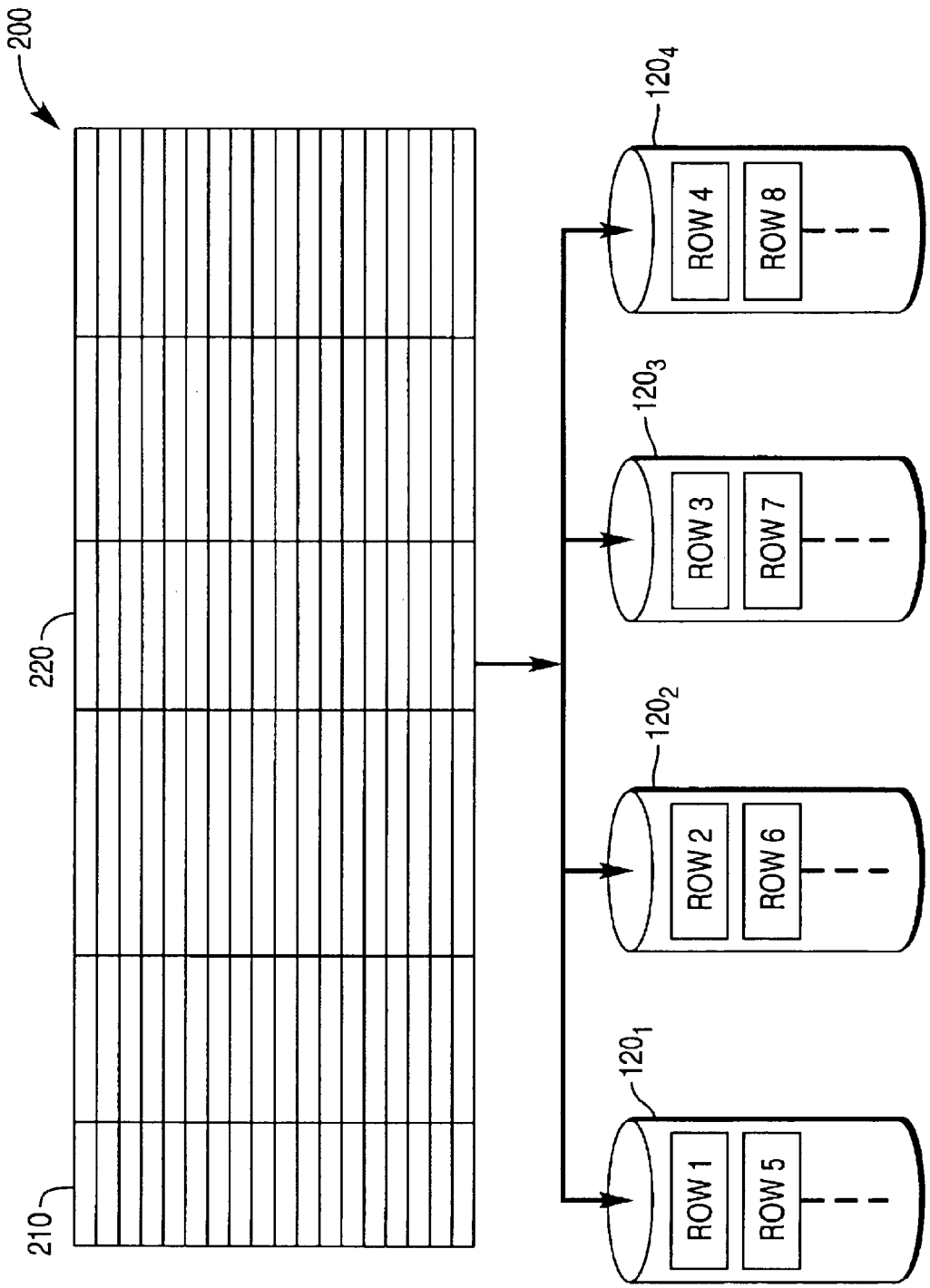
FIG. 2 is a flow diagram of a table distribution process.

FIG. 2 shows one implementation of how the rows of a table are distributed. The table 200 contains a plurality of rows and is stored in a plurality of data storage facilities $120_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities $120_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 2.

Queries involving the values of columns in the primary index can be efficiently executed because the processing module $110_n$ on having access to the data storage facility $120_n$ that contains the row can be immediately determined. For example, referring to FIG. 2, if values from row 2 are desired, the parsing engine 130 can apply the hashing function to determine that only processing module $110_2$ needs to be used. As another example, an equality join between two tables that have the same primary index columns is more efficient at least in the sense that all of the rows that need to be joined are found in the same data storage facility $120_n$ and no movement of information from rows between the facilities is necessary.

Figure 3:
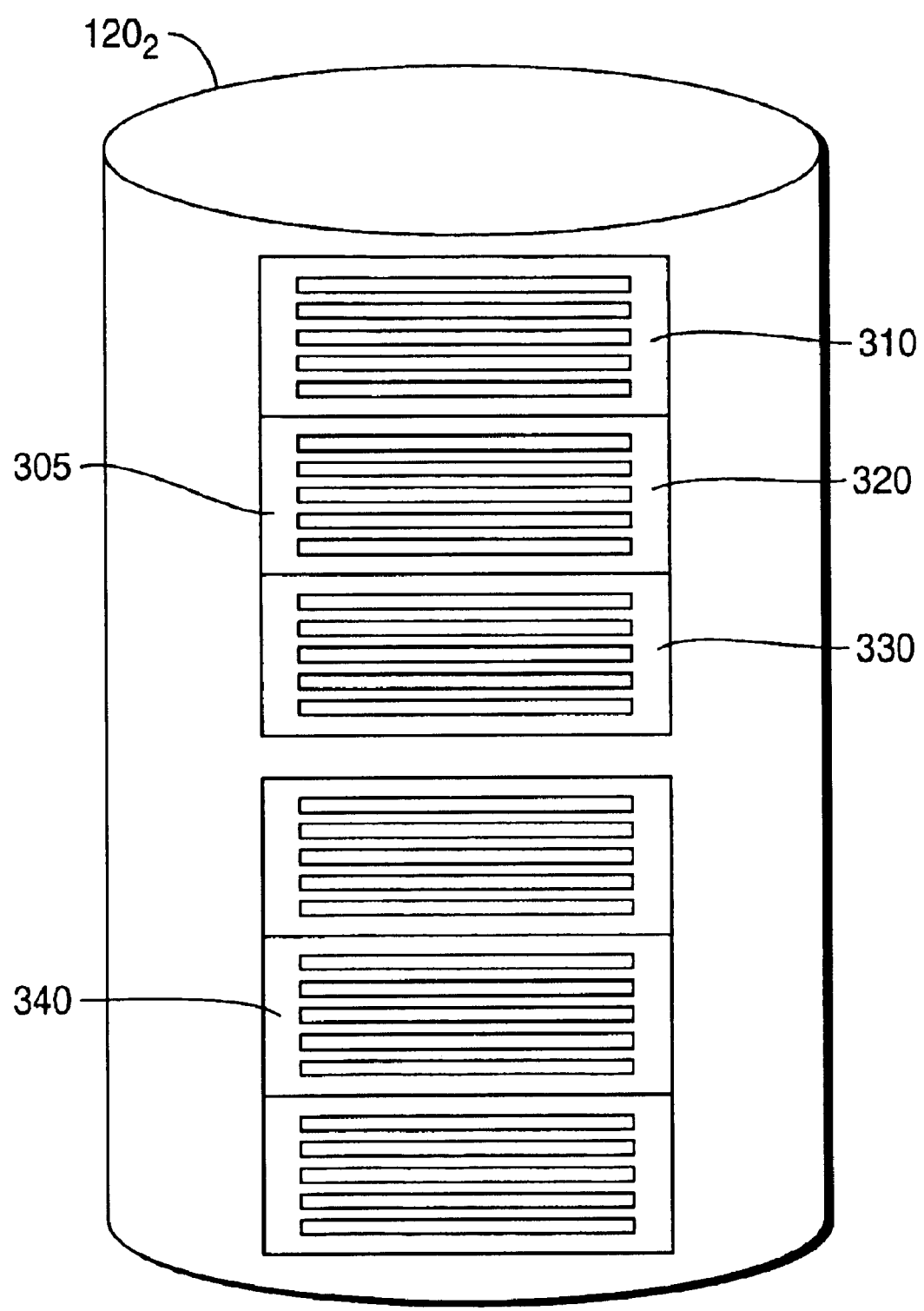
FIG. 3 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 3, a partitioned database storage facility $120_2$ is shown. Rows from two partitioned tables 305 and 340 are organized within the storage facility $120_2$ in accordance with a row identification (row ID), which can include values associated with a partition function as well as values associated with the hash function and a uniqueness value. The rows stored in the storage facility $120_2$ are ordered at a top level by the result of the partition function. As a result, a first group of rows 310 has one partition function value. A second group of rows 320 has another partition function value. A third group of rows 330 has a third partition value. The groups 310, 320, 330 are ordered by their partition values and are also known as partitions.

The rows are also sorted within each partition. For example, the first partition 310 contains five rows. Those rows are stored within that partition 310 in the order of the hash result for each row. The hash result therefore acts as a sorting value. A uniqueness value is also maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows for orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two month period are desired, only two partitions would need to be checked for the specified product. The monthly range is just one example of a possible partition function. Any type of function can be used.

For one implementation of joining two tables or other data structures in a DBS 100, rows to be joined are (1) within the same data storage facility and (2) organized and processed by the associated processing module such that they can be matched in accordance with whatever conditions are specified by the join command, i.e., the join conditions. When one of the join conditions is on the one or more primary index columns, the hash result of which is used to distribute rows among storage facilities, the first condition is satisfied. This condition is satisfied, for example, when the join condition includes the entire set of primary index column(s) and the optimizer chooses to hash on this set of column(s). Under these circumstances, there is the additional benefit that the tables involved in the join can be directly accessed without spooling or sorting. With regard to the second condition, if the rows are sorted in hash order in each storage facility, the rows can easily be matched in order. When one of the join conditions is on the one or more primary index columns, rows with the same hash value from one table or data structure can only potentially match with rows with the same hash value from the other table or data structure, because identical primary index column values result in identical hash values. Identical hash values, however, do not necessarily indicate identical primary index column values, because more than one primary index column value can result in the same hash value. Such primary index column values are sometimes referred to as hash synonyms. A row hash match scan method skips over rows from one table that do not have rows with corresponding hash values in the other table. For example, if on average there are 4 rows with the same hash in each table, for each row in one table the join conditions will only need to be evaluated for the 4 rows in the other table with the same hash instead of all the rows in the other table.

In one implementation of a DBS table with a partitioned primary index, the rows in each storage facility are divided up into partitions and ordered by hash within each partition. As a result, rows with the same hash value may be in different partitions rather than together as they would be if they were ordered only by hash. One option for executing a join command specifying a condition on the primary index columns in such a table is to copy the table rows and sort the copy by hash so that the row hash match scan method can be performed on the sorted copy. For a nonpartitioned table that has a primary index on the join columns, this extra copying and sorting is unnecessary and the join can take place directly from the table.

Figure 4:
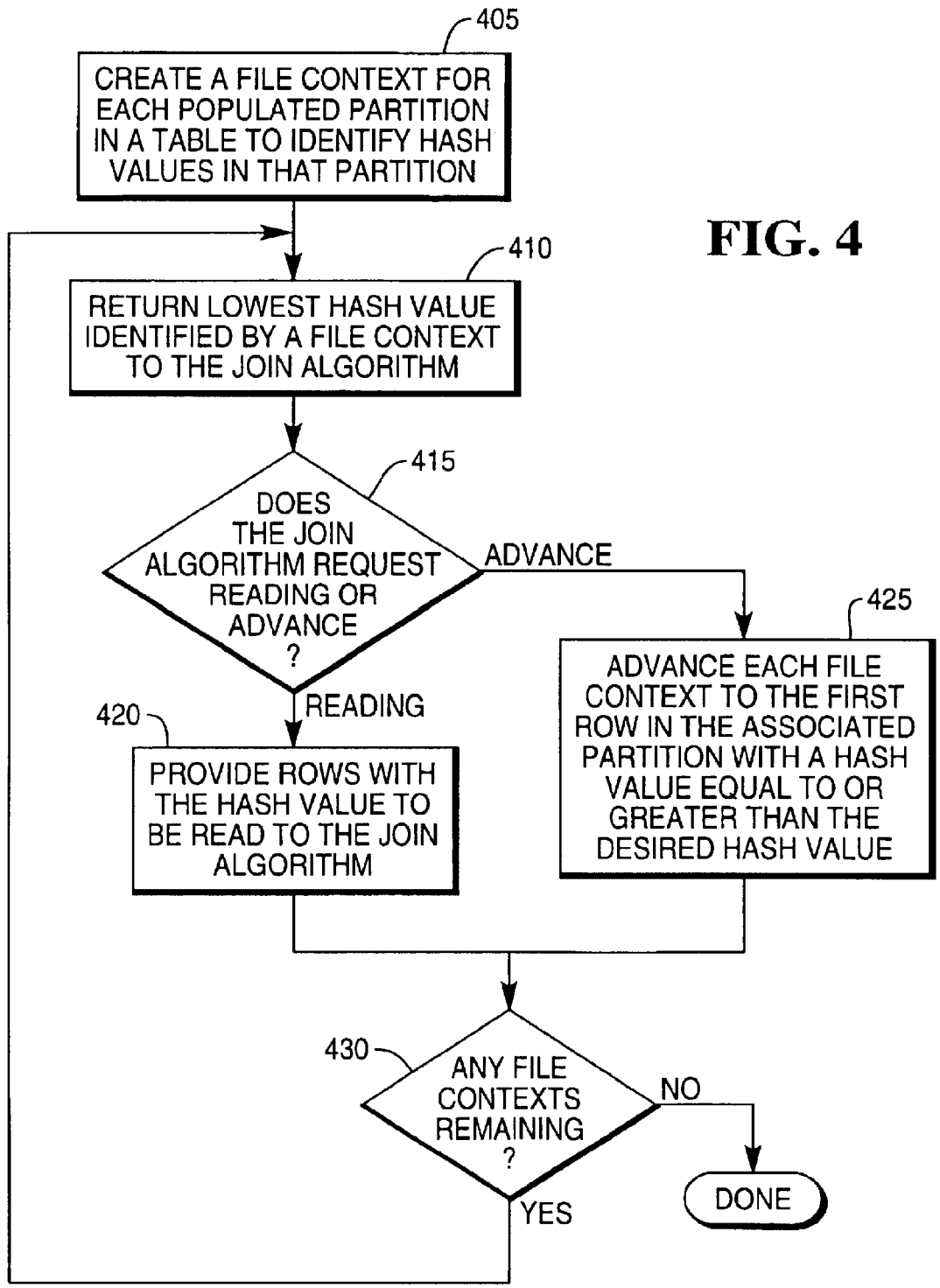
FIG. 4 is a flow chart of an algorithm for selecting rows from a partitioned table where file contexts are assigned to each populated partition in the table.

One implementation of a process of joining two tables, at least one of which is partitioned, using a row hash match scan algorithm involves creating a file context for each populated partition, as will be described further with reference to FIGS. 4–7. According to one implementation of this process, as depicted in FIG. 4, selecting rows by hash value from a partitioned database table for a row hash match scan algorithm includes several steps. If a partitioned table and a nonpartitioned table are joined, the process can be used on the partitioned table. If two partitioned tables are being joined, the process can be used on both tables. First, the process creates a file context for each populated partition in the one or more partitioned tables specified in the join command to track hash values in that partition 405 (more particularly described with respect to FIG. 5). The process then determines the lowest hash value identified by the file contexts for the table and provides that value to the join algorithm 410. The join algorithm requests a reading of a hash value or an advance to a hash value 415. If the join algorithm requests a reading, rows in the partitioned table with that hash value are provided to the algorithm 420 (more particularly described with respect to FIG. 6). If the join algorithm requests an advance, each file context for the partitioned table is modified, if necessary, to identify the first row with the desired hash value or a greater hash value 425 (more particularly described with respect to FIG. 7). If file contexts remain 430, the lowest identified hash value is again provided to the join algorithm 410. If no file contexts remain 430, the process of selecting rows is finished. In one implementation, the join algorithm receives a signal indicating that the partitioned table has no rows with hash values equal to or greater than the last requested hash value.

Figure 5:
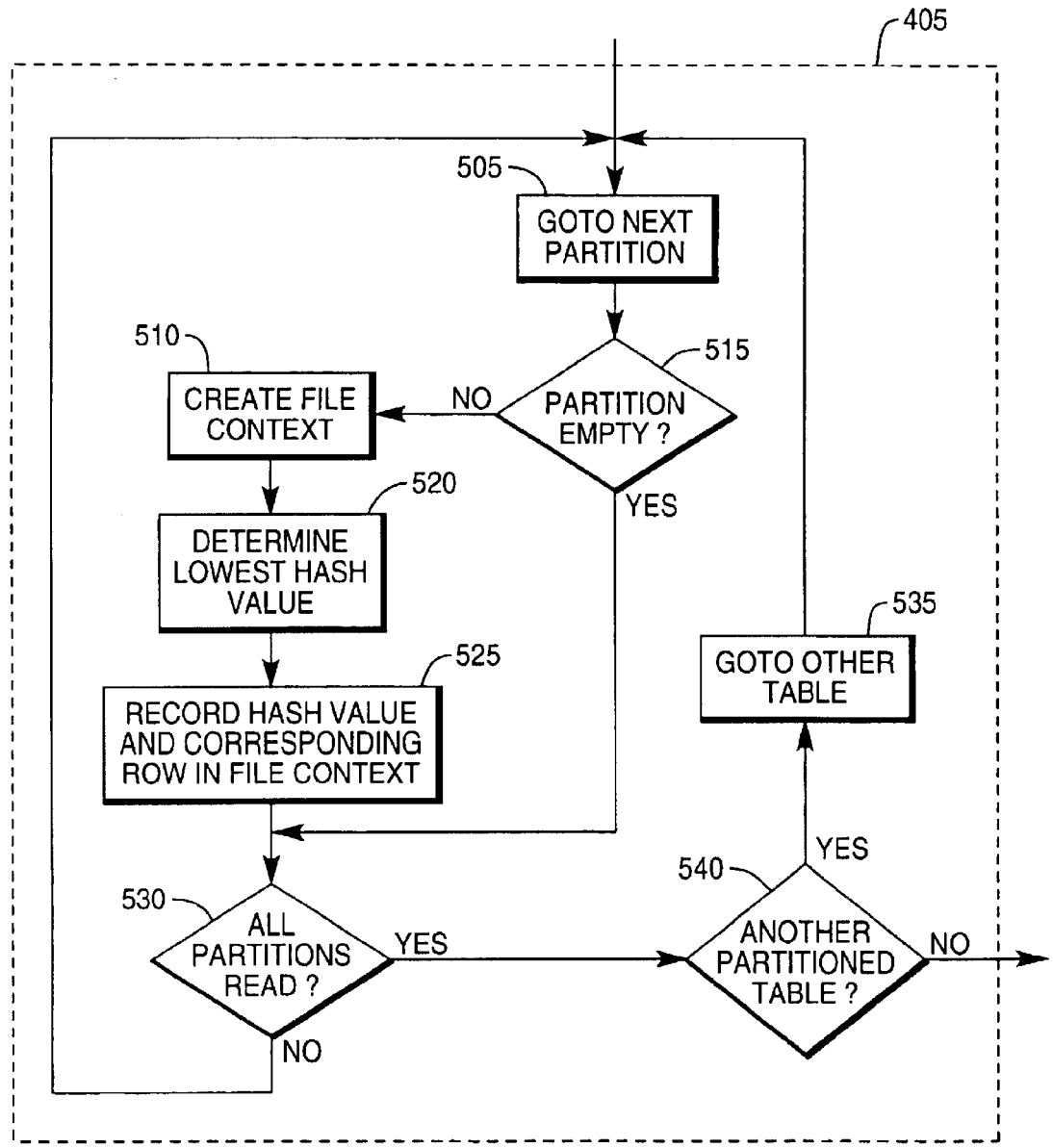
FIG. 5 is a flow chart of an algorithm for creating a file context for each populated partition in one or more tables.

One implementation of the process of creating file contexts for all populated partitions is depicted in FIG. 5 and involves examining the next partition (or the first partition at the very beginning of the process) in a partitioned table 505. If that partition is empty 515 and unexamined partitions still exist in the table 530, the next partition is checked to see if it contains rows 515. If that partition is populated with one or more rows 515, an empty file context for that partition is created 510. The associated partition is then examined to find the row containing that partition's lowest hash value or, in another implementation, to find the row containing that partition's lowest hash value greater than or equal to a given hash value 520. Once a value meeting those criteria is found in a row in the partition, location information for that row, as well as the hash value itself, are stored in that partition's file context 525. In one implementation, the file context is not created until the initial location data and hash value for it are determined. If unexamined partitions still exist in the table 540, the next partition is examined 505, and the process is repeated. If all partitions in the table have been examined and another table specified in the join command is a partitioned table, the partitions in the next table are examined 535. When all partitions in all specified, partitioned tables have been examined, the process of creating file contexts is complete.

In one specific implementation, the process of creating file contexts entails, first, an empty file context is created and the file system is requested to find a first data block with a hash value equal to or higher than 'hhhhhhhh' (hexadecimal notation). The value 'hhhhhhhh' is the desired starting hash value or '00000000' if it is desired to find the first hash value in the table. The join algorithm picks one of the two tables/spools in the join and finds its lowest hash value; then using that hash value, probes into the other table/spool. The file system positions to the first data block containing a row with equal or higher hash value than the desired hash value, reads that data block and then positions to the first row in that data block with an equal or higher value than the desired hash value. Another empty file context is created. The file system is requested to find the next row using that file context with a hash value equal to or higher than 'hhhhhhhh' in a partition that is at least one higher than the partition number in the row identification (row ID) of the first row found. This is continued until no row is found, creating as many file contexts as needed in the process. The file contexts are linked together so that the file contexts can easily be traversed. If, in a specific implementation, the number of partitions is limited to at most 256, no more than 256 file contexts are created.

Referring again to FIG. 4, the lowest hash value of the new file contexts for a partitioned table is determined. In one implementation of this step, the hash value in the first file context for the partitioned table is examined and stored as the "lowest" hash value. Then, the hash value in the next file context for that table is examined, and if this new value is smaller than the "lowest" hash value, the new value is stored as the "lowest" hash value. That step is repeated until every file context has been examined, at which point the "lowest" hash value has been determined.

Figure 6:
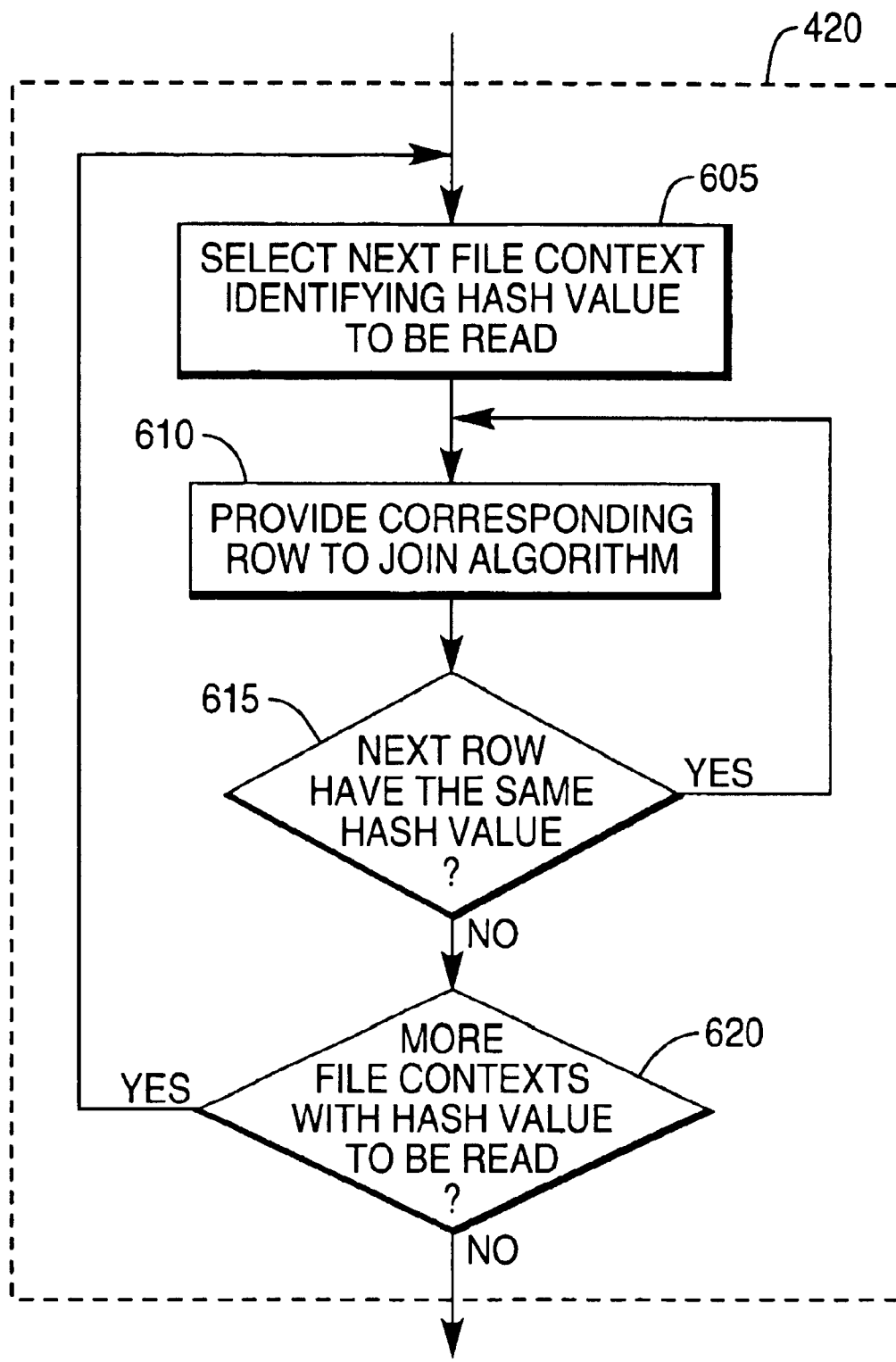
FIG. 6 is a flow chart of an algorithm for providing rows with a particular hash value.

As depicted in FIG. 4, the join algorithm can request that rows having a particular hash value be read from a partitioned table. One implementation for reading rows is depicted in FIG. 6 and begins with selecting the next partition (or the first partition at the very beginning of the process) that identifies the hash value to be read 605. The stored location data is used to provide the row data to the join algorithm 610. The next row in the partition is then checked to see if it has the same hash value 615. If it does, its data is also provided to the join algorithm. Those two steps continue until a row with a different hash value is located or no more rows are in the partition. If more file contexts identifying the hash value to be read remain 620, rows are provided using the data in those file contexts 605. If not, all the rows have been provided. In one case, the join algorithm can request that rows with the same hash value be read again. For example, insufficient available memory requires that if there are many rows with the same hash value, they are compared piecemeal with rows loaded into memory in partial sets.

Figure 7:
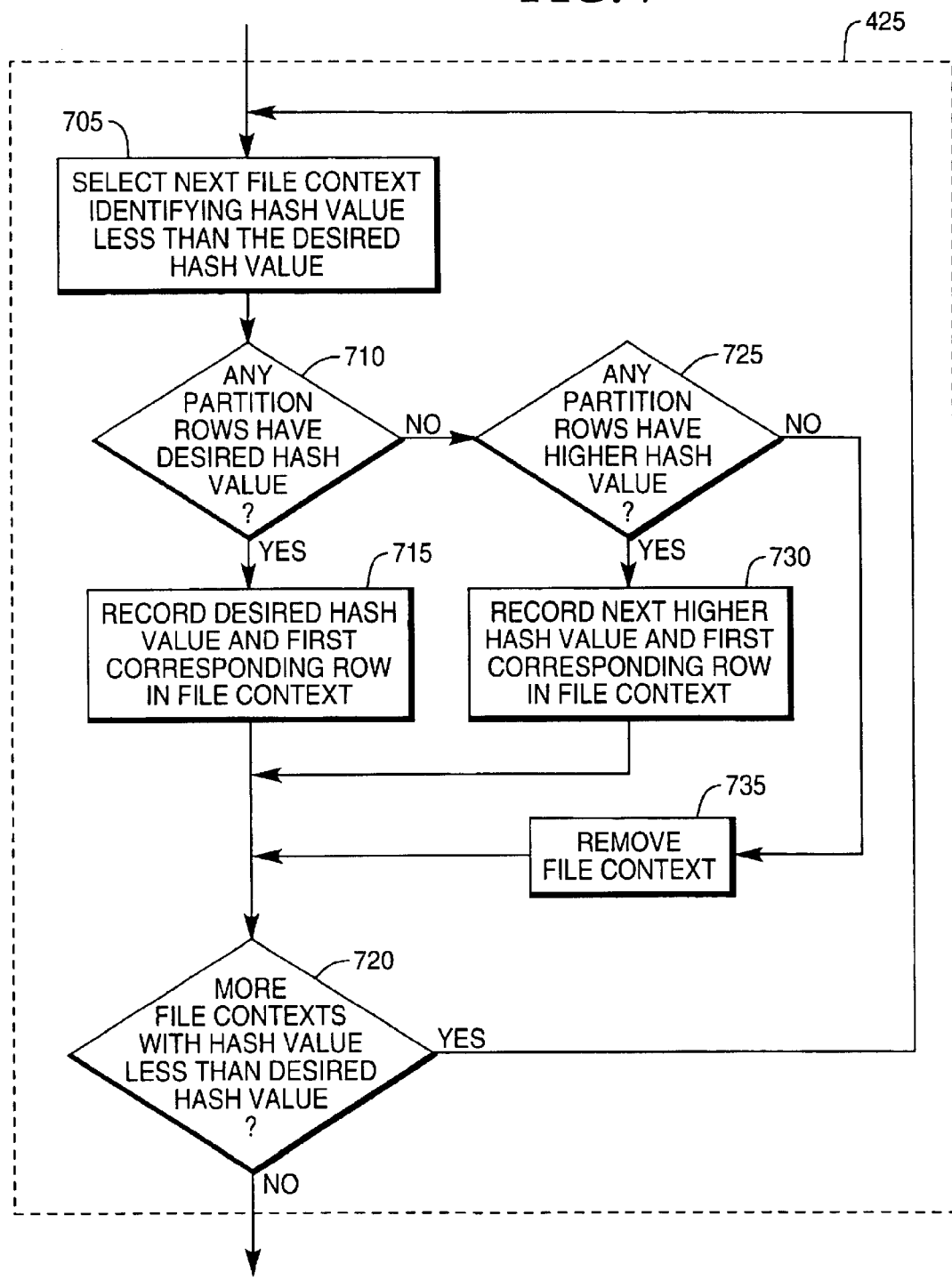
FIG. 7 is a flow chart of an algorithm for advancing the file contexts.

FIG. 7 depicts one implementation of the process of advancing each file context to the first row in the associated partition that has a hash value greater than or equal to a desired hash value 425. The implementation begins with selecting the next partition (or the first partition at the very beginning of the process) that identifies a hash value less than the desired value 705. If a partition identifies a hash value greater than or equal to the desired hash value, it does not need to be advanced, though in some implementations it could be (for instance, if residual conditions indicate that the found row is not applicable). Once a file context with a lesser hash value is identified, the rows in the associated partition are examined for the desired hash value 710. If one or more such rows exist, the hash value and location data for the first such row is recorded in the file context 715. If not, the rows in the associated partition are examined for a hash value greater than the desired hash value 725. If one or more such rows exist, the hash value and location data for the first such row is recorded in the file context 730. If no rows with hash values greater than or equal to the desired hash value are present in the partition, the file context is removed 735. The remaining file contexts are then examined for identified hash values less than the desired hash value 720 and the process repeats for any such file contexts.

In one implementation, the above-described algorithm for selecting rows from a partitioned table for use by a join algorithm can be used whenever a database system function, not necessarily a join algorithm, needs to access rows of a partitioned table in hash value order. The database system function can request rows as though the table was ordered only by hash value and the algorithm will use file contexts to deliver the rows appropriately. Thus, for example, a join command specifying two tables can invoke a join algorithm that will operate equivalently without regard to whether none, one, or both tables are partitioned. While the above implementations discuss the use of hash values, in alternate implementations other values associated with the various rows can be used.

The row hash match scan algorithm described above takes advantage of file contexts assigned to each partition in the tables to be joined. These file contexts, however, consume memory, and as the number of partitions increases, memory usage by file contexts (and the associated data blocks, if any) may become excessive and adversely affect system performance. One alternative is to spool out and sort the data, and then present the sorted data to the row hash match algorithm, a significantly slower process. Another alternative described more fully below is to utilize a reduced number of file contexts, and perform the row hash match algorithm using this reduced number of file contexts.

Figure 8:
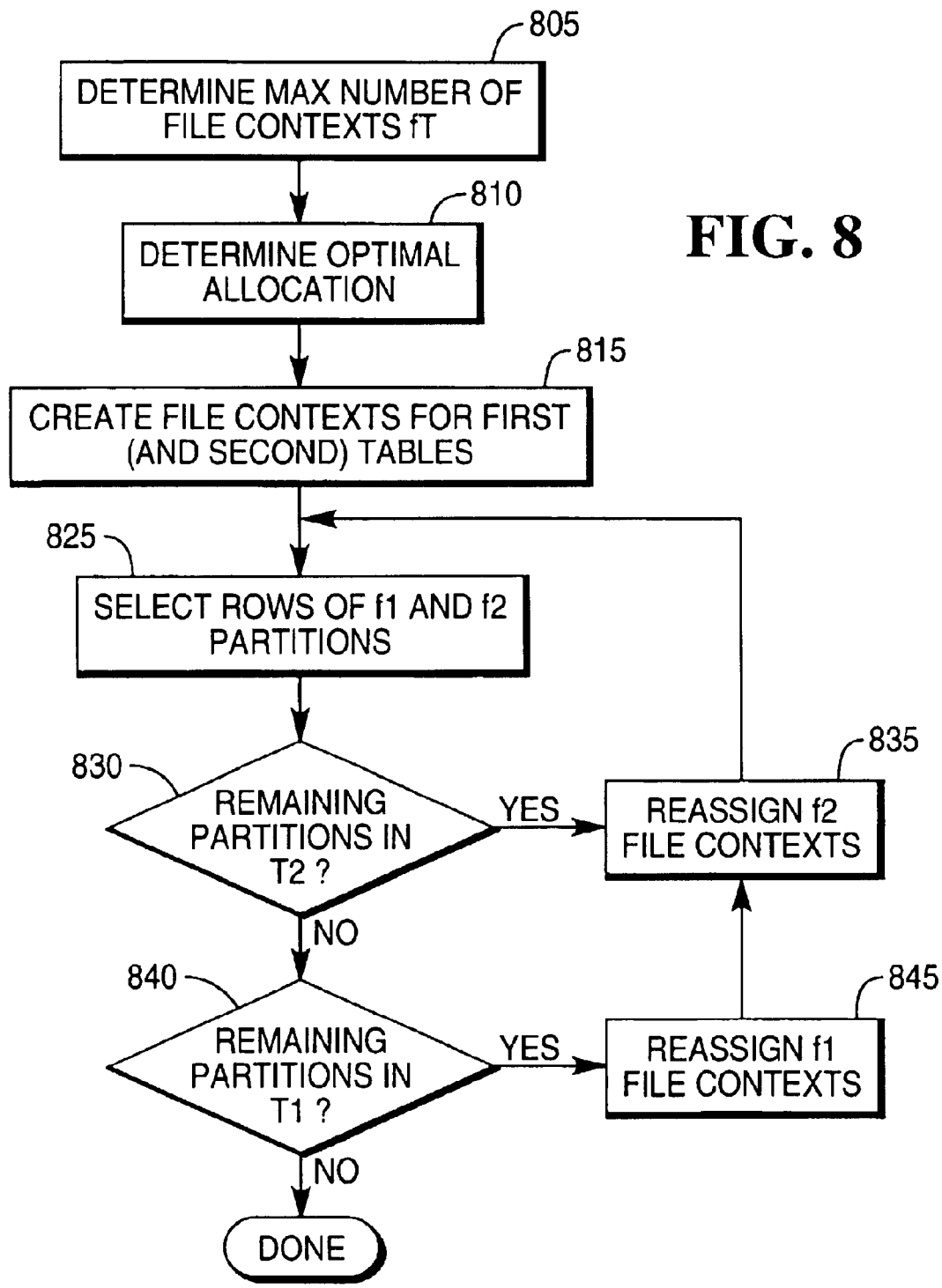
FIG. 8 is a flow chart of an algorithm for selecting rows from iteratively chosen subsets of the partitions in one or more partitioned tables using file contexts.

As depicted in FIG. 8, one implementation of a process of selecting rows from two tables, at least one of which is partitioned (table 1 and table 2) using a row hash match scan algorithm and a reduced number of file contexts includes several steps. First, the maximum number of file contexts fT to be allocated to tables 1 and 2 is determined 805. This maximum number of file contexts can be determined in advance by assessing, for example, available memory, the number of users that may be attempting to access data, the operations performed by the users in doing so, and any other relevant information, or some subset of those factors. In one implementation, the amount of memory to be allocated divided by the representative data block size provides the maximum number of file contexts that can be allocated. If both tables are partitioned, at least one file context is allocated to each table. Next, an optimal allocation among tables 1 and 2 of this maximum number of file contexts is determined 810. If only one table is partitioned fT−1 file contexts are allocated to the partitioned table and one file context to the other table.

Figure 9:
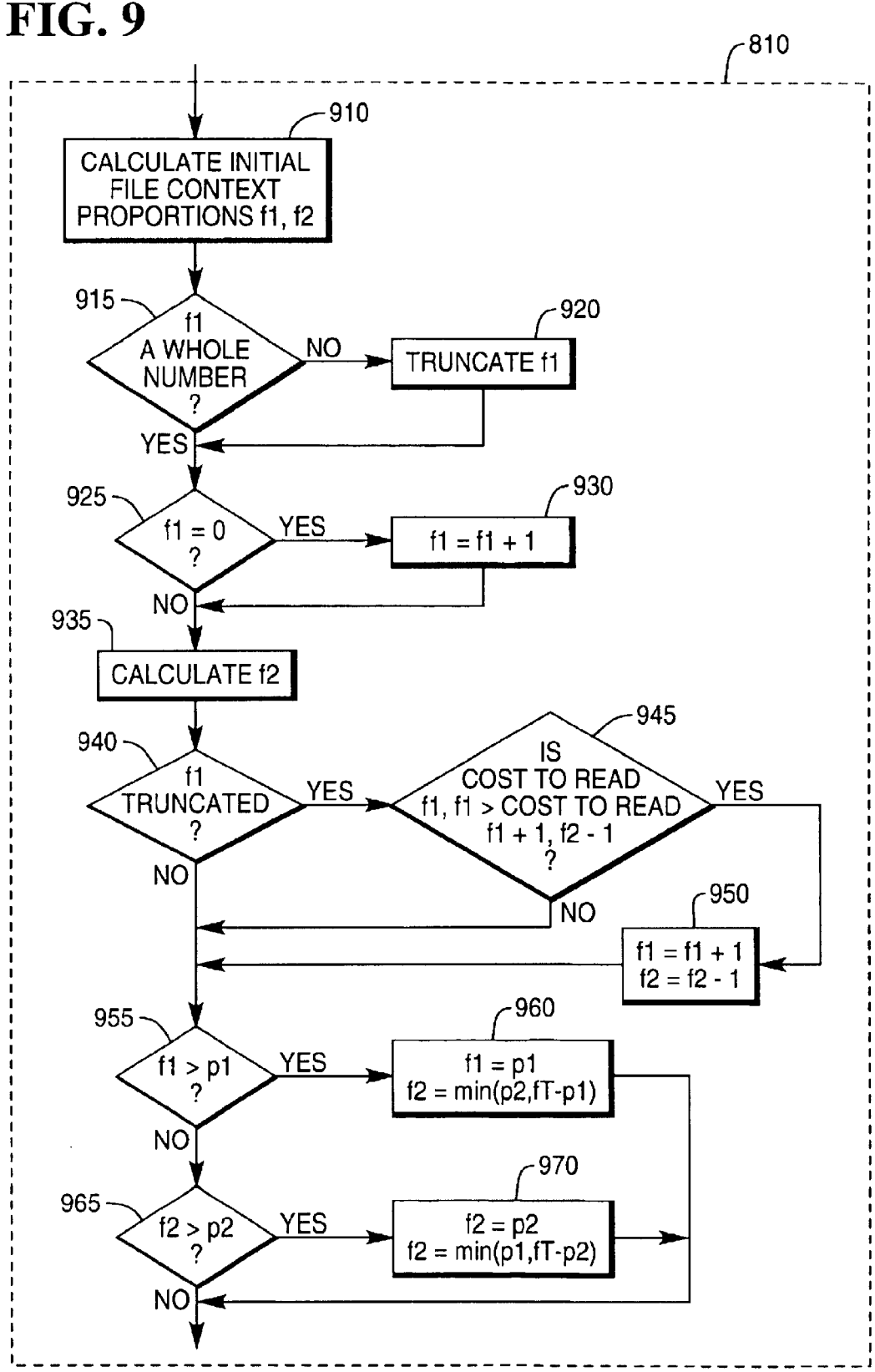
FIG. 9 is a flow chart of an algorithm for defining partition subsets in an iteration of the algorithm of FIG. 8.

According to one implementation, a method for determining an optimal allocation of file contexts 810 among partitioned tables 1 and 2 is illustrated in FIG. 9. This method involves first calculating an initial allocation of file contexts f1, f2 (step 910). The variable f1 is used to represent the number of file contexts for table 1. The variable f2 is used to represent the number of file contexts for table 2. In one implementation, this can be accomplished by first determining the read cost for the entire join as a function of the allocation. The read cost can be approximated by the following equation:

$$(p2/f2)*r1+(p1/f1)*r2, \quad (1)$$

where p1 and p2 represent the number of partitions of tables 1 and 2, respectively, f1 and f2 (the values to be solved for) represent the number of partitions to be read at one time (f1 is constrained to be less than or equal to p1 and f2 is constrained to be less than or equal to p2), that is, the number of partitions in an iterative subset, in tables 1 and 2, respectively, and r1 and r2 represent the cost to read once through tables 1 and 2, respectively. When we take into consideration the fact that f1+f2=fT, the equation becomes $$(p2/(fT-f1))*r1+(p1/f1)*r2. \quad (2)$$

This equation is an approximation and assumes even distribution of data blocks to partitions. More precise formulas that take into account these parameters or others can also be used.

Next, the value of f1 that minimizes the read cost can be found by differentiating equation (2) with respect to f1, setting the result equal to zero and solving for f1, yielding the following result:

$$f1=(fT*R/(1+R)), \text{ where } R=\sqrt{(r2/r1)*(p1/p2)}. \quad (3)$$

In one implementation, rows are stored individually. In another implementation, data is stored with a number of rows in a single block. Assuming the read cost per data block of each table is approximately the same, R may then be calculated as $$R=\sqrt{(db2/db1)*(p1/p2)}, \quad (4)$$

where db1 and db2 represent the number of data blocks in tables 1 and 2, respectively.

Once a value is obtained for f1, if f1 is a not a whole number 915 its value is truncated 920. Further, if f1=0 925, then 1 is added to f1 930 to ensure that there is at least one file context allocated to table 1. Next, f2 is determined 935 (f2=fT−f1). Further, in one implementation, if f1 had been truncated 940, it is then determined whether the read cost of (f1, f2) is greater than the read cost of (f1+1, f2−1) 945. This latter step ensures that in the case that f1 is truncated, both the situation in which f1 is rounded down and the situation in which f1 is rounded up are tested to ensure which case results in the lowest read cost. If the latter is true, then f1 is set to (f1+1) and f2 is set to (f2−1) 950. Further, if f1 is greater than p1 955, then f1 is set to p1 and f2 is set to the minimum of p2 and fT−p1 960. If f2 is greater than p2 965, then f2 is set to p2 and f1 is set to the minimum of p1 and fT−p2 970. Thus, the optimal values for f1 and f2 have now been determined. Again, these optimal values are particular to the selected equation and underlying assumptions, and different equations and/or assumptions may result in a slightly different set of optimal values.

Returning back to FIG. 8, once an optimal allocation of file contexts (f1, f2) among tables 1 and 2 is determined, f1 file contexts are then created for f1 partitions in table 1, and if necessary (if table 2 is also partitioned) f2 file contexts are created for f2 partitions in table 2 815. This can be done in the same manner as described above in conjunction with FIG. 5, except that subsequent partitions are examined in table 1 and file contexts created for populated partitions only until f1 file contexts have been created, with the same being true for f2 file contexts for table 2.

Once f1 file contexts have been created for the first f1 populated partitions in table 1 and f2 file contexts have been created for the first f2 populated partitions in table 2, rows for these f1 and f2 partitions can be selected in the manner described above in conjunction with FIGS. 4 and 6–7 825. In other words, portions of tables 1 and 2 corresponding to the f1 and f2 partitions are joined as if those portions constituted the entire table. (See steps 410 through 430 of FIG. 4 for details.) When this is complete, however, the f1 partitions of table 1 must still be joined with the remaining partitions in table 2, if any.

If it is determined that partitions that have not been assigned file contexts remain in table 2 830, the f2 file contexts are now reassigned to the next f2 remaining populated partitions in table 2 835, if that many populated partitions remain in the second table, otherwise to the remaining partitions. In one implementation, reassigning is accomplished by advancing row pointers within the file contexts and deleting file contexts at the end of the join. In another implementation, reassigning is accomplished by deleting and recreating the file contexts. According to one implementation, the new set of f2 file contexts are created as described above, where the first partition to be examined is the partition following the last one to previously have been assigned a file context. Rows from the f1 partitions and new f2 partitions are then selected as described above. This process is repeated until no partitions remain in table 2 that have not been joined with the first f1 partitions of table 1. It is then determined whether there are any remaining partitions in table 1 that have not been joined 840. If not, the process is complete. Otherwise, the f1 file contexts are reassigned to the next remaining f1 partitions in table 1, if that many populated partitions remain in the second table, otherwise to the remaining partitions. According to one implementation, the f2 file contexts are also reassigned again to the first set of f2 partitions from table 2. In some cases, the f2 file contexts are not reassigned. Instead, the rotation of the f2 file contexts begins where it was when the f1 file contexts were reassigned. In that case, the output of block 845 bypasses block 835 and runs directly to block 825. Once the file contexts are reassigned, rows are selected from the new f1 and first f2 set of partitions. This process is repeated until all partitions of tables 1 and 2 have been joined.

Figure 10A:
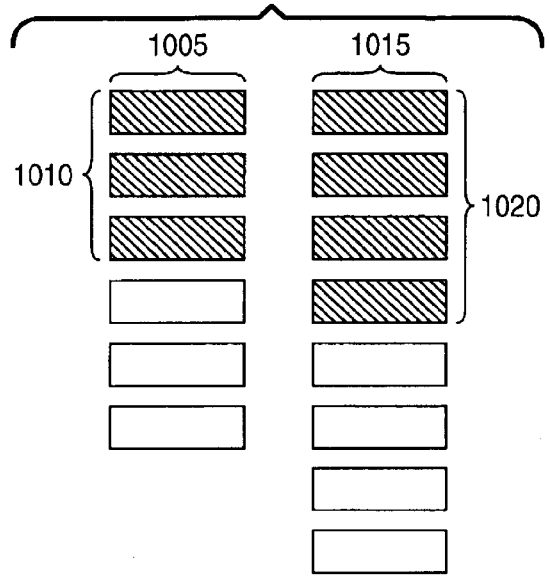
FIGS. 10A–10D are block diagrams of partition subsets defined in one implementation of the invention.
Figure 10B:
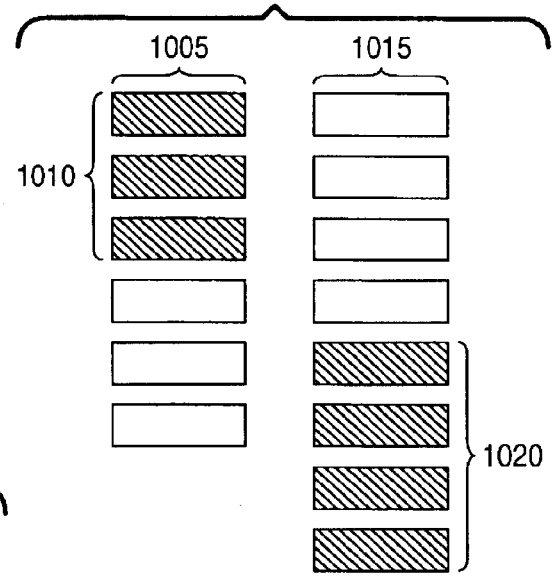
Figure 10C:
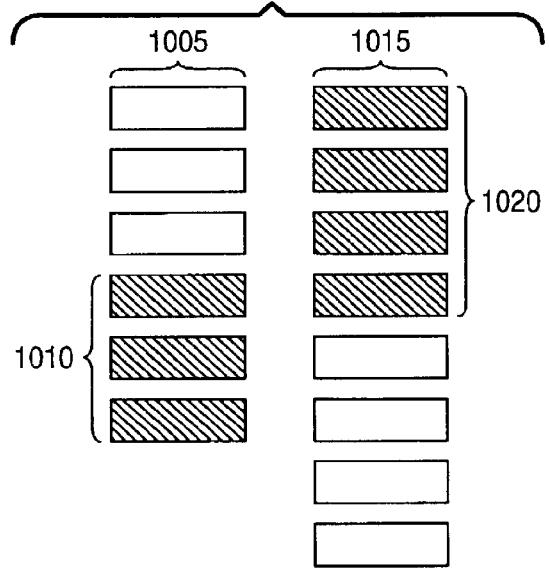
Figure 10D:
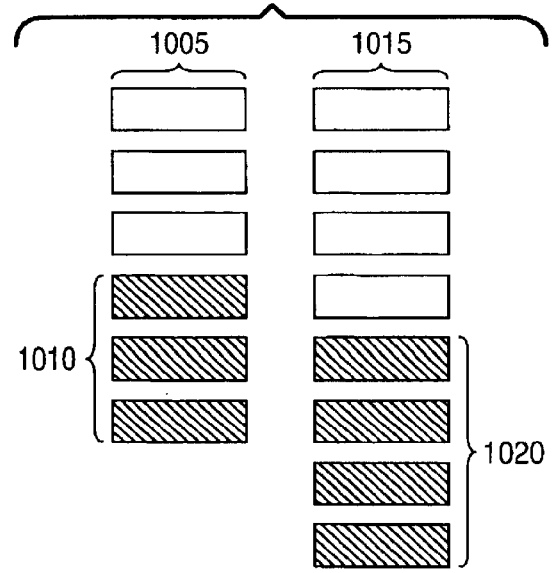

FIGS. 10A–D depict block diagrams of two partitioned tables being joined using an implementation of the method. The value of fT is calculated to be seven, the value of f1 is calculated to be three, and the remaining file contexts are used for f2. As depicted in FIG. 10A, the first subset of table 1 partitions, including f1 partitions, is joined to the first subset of table 2 partitions, including f2 partitions by selecting rows using the file contexts. In FIG. 10B, the next iteration focuses on the first subset of table 1 and the second subset of table 2. In FIG. 10C, the next iteration focuses on the second subset of table 1 and the first subset of table 2. In FIG. 10D, the final iteration focuses on the second subset of table 1 and the second subset of table 2. In this manner each of the partitions in table 1 presented to the join algorithm with each partition of table 2 during a single iteration.

According to one implementation, file contexts that are allocated to a certain table, but not used by that table, may be reallocated to the other table. For example, if the number of file contexts allocated to table 1 is greater than the number of populated partitions in table 1, any remaining file contexts may be reallocated to table 2 to ensure that all file contexts are used efficiently. Further, as stated above, if only one table is partitioned, the process can be used on the partitioned table.

Thus, the system and method described above permits joining of two tables having partitioned primary indexes using a row hash match scan algorithm even when the number of partitions is very large, by limiting the number of file contexts and data blocks needed to be kept in memory at any one time.

The text above describes one or more specific implementations of a broader invention. The invention is also carried out in a variety of alternative implementations and thus not limited to those directed described here. For example, while the invention has been described in terms of a database management system that uses a massively parallel processing architecture, other types of database systems and architectures, including databases having a symmetric multiprocessing architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

What is claimed is:

1. A method for selecting rows from first and second tables each having rows containing values in columns, in at least the first table the rows being divided into partitions at least one of which is populated by one or more rows, the method comprising:

a. defining a subset of the populated partitions of the first table that excludes at least one populated partition of the first table;

b. creating a file context, which stores at least location data for a row and a first value associated with the row, for each populated partition in the subset of the populated partitions of the first table;

c. determining the lowest first value stored by the file contexts for the first table;

d. identifying rows with a particular first value by at least reading the file contexts of the first table; and e. repeating a through d until the subsets of the populated partitions of the first table have included all the populated partitions of the first table.

2. The method of claim 1 wherein defining a subset includes calculating a total number of file contexts for both tables.

3. The method of claim 1 wherein the rows of the second table are divided into partitions.

4. The method of claim 3 further comprising:

a'. defining a subset of populated partitions of the second table;

b'. creating a file context, which stores at least location data for a row and a first value associated with the row, for each populated partition in the subset of the populated partitions of the second table;

c'. determining the lowest first value stored by the file contexts for the second table;

d'. identifying rows with a particular first value by at least reading the file contexts of the second table; and f. repeating a through e and a' through d' until the subsets of the populated partitions of the first table have included all the populated partitions of the first table and wherein e includes repeating b through d and a' through d' until the subsets of the populated partitions of the second table have included all the populated partitions of the second table.

5. The method of claim 1 wherein creating a file context comprises changing the location data and first value to correspond to a row in a different partition.

6. The method of claim 1 wherein the rows are stored in order of their corresponding first value within the partitions.

7. The method of claim 1 wherein the first value corresponding to a row is the result of a hash function applied to the values in one or more columns.

8. The method of claim 1 wherein defining a subset of the populated partitions of the first table includes:

i. representing a total read time for the first and second tables in terms of a variable representing the number of partitions in a subset of the partitions of the first table;

ii. determining the rate of change in total read time in terms of the number of partitions in a subset;

iii. truncating the number of partitions for which the rate of change in total read time is zero; and iv. increasing the number of partitions to one if truncation results in a value of zero.

9. The method of claim 8 wherein defining a subset of the populated partitions of the first table includes:

v. if truncation results in a value greater than zero, determining whether the read cost for a subset including an additional partition is less than the read cost for the current number of partitions and increasing the number by one if the read cost with the additional partition is lower.

10. The method of claim 1 wherein a number, f1, of populated partitions in a subset of the partitions of the first table is determined in accordance with the equation:

$$f1=(fT*R/(1+R))$$

where fT is a total number of file contexts for both tables and $$R=\sqrt{(r2/r1)*(p1/p2)}$$

where r1 and r2 represent a cost to read once through tables 1 and 2, respectively, and p1 and p2 represent the number of populated partitions of tables 1 and 2, respectively.

11. The method of claim 1 wherein a number, f1, of populated partitions in a subset of the partitions of the first table is determined in accordance with the equation:

$$f1=(fT*R/(1+R))$$

where fT is a total number of file contexts for both tables and $$R=\sqrt{(db2/db1)*(p1/p2)}$$

where tables 1 and 2 require db1 and db2 data blocks of storage, respectively, and p1 and p2 represent the number of populated partitions of tables 1 and 2, respectively.

12. A database system for iteratively selecting rows from a first table, the database system including a second table, the first table including rows and columns and being divided by rows into partitions and at least one of the partitions in the table being populated by one or more rows, the system comprising:

one or more nodes;

a plurality of CPUs, each of the one or more nodes providing access to one or more CPUs;

a plurality of processes, each of the one or more CPUs providing access to one or more virtual processes;

each process configured to manage data, including the partitioned database table, stored in one of a plurality of data-storage facilities;

a partitioned table access component configured to select rows from at least the first table by a. defining a subset of the populated partitions of the first table that excludes at least one populated partition of the first table;

b. creating a file context, which stores at least location data for a row and a first value associated with the row, for each populated partition in the subset of the populated partitions of the first table;

c. determining the lowest first value stored by the file contexts for the first table;

d. identifying rows with a particular first value by at least reading the file contexts of the first table; and e. repeating a through d until the subsets of the populated partitions of the first table have included all the populated partitions of the first table.

13. The system of claim 12 wherein defining a subset includes calculating a total number of file contexts for both tables.

14. The system of claim 12 wherein the rows of the second table are divided into partitions.

15. The system of claim 14 wherein the partitioned table access component selects rows by:

a'. defining a subset of populated partitions of the second table;

b'. creating a file context, which stores at least location data for a row and a first value associated with the row, for each populated partition in the subset of the populated partitions of the second table;

c'. determining the lowest first value stored by the file contexts for the second table;

d'. identifying rows with a particular first value by at least reading the file contexts of the second table; and f. repeating a through e and a' through d' until the subsets of the populated partitions of the first table have included all the populated partitions of the first table; and wherein e includes repeating b through d and a' through d' until the subsets of the populated partitions of the second table have included all the populated partitions of the second table.

16. The system of claim 12 wherein creating a file context comprises changing the location data and first value to correspond to a row in a different partition.

17. The system of claim 12 wherein the rows are stored in order of their corresponding first value within the partitions.

18. The system of claim 12 wherein the first value corresponding to a row is the result of a hash function applied to the values in one or more columns.

19. The system of claim 12 wherein defining a subset of the populated partitions of the first table includes:

i. representing a total read time for the first and second tables in terms of a variable representing the number of partitions in a subset of the partitions of the first table;

ii. determining the rate of change in total read time in terms of the number of partitions in a subset;

iii. truncating the number of partitions for which the rate of change in total read time is zero; and iv. increasing the number of partitions to one if truncation results in a value of zero.

20. The system of claim 19 wherein defining a subset of the populated partitions of the first table includes:

v. if truncation results in a value greater than zero, determining whether the read cost for a subset including an additional partition is less than the read cost for the current number of partitions and increasing the number by one if the read cost with the additional partition is lower.

21. The system of claim 12 wherein a number, f1, of populated partitions in a subset of the partitions of the first table is determined in accordance with the equation:

$$f1=(fT*R/(1+R))$$

where fT is a total number of file contexts for both tables and $$R=\sqrt{(r2/r1)*(p1/p2)}$$

where r1 and r2 represent a cost to read once through tables 1 and 2, respectively, and p1 and p2 represent the number of populated partitions of tables 1 and 2, respectively.

22. The system of claim 12 wherein a number, f1, of populated partitions in a subset of the partitions of the first table is determined in accordance with the equation:

$$f1=(fT*R/(1+R))$$

where fT is a total number of file contexts for both tables and $$R=\sqrt{(db2/db1)*(p1/p2)}$$

where tables 1 and 2 require db1 and db2 data blocks of storage, respectively, and p1 and p2 represent the number of populated partitions of tables 1 and 2, respectively.

23. A computer program, stored in a tangible medium, for selecting rows from a first table, the first table having rows and columns and divided by row into partitions, at least one of the partitions being populated by rows, the program comprising executable instructions that cause a computer to:
 a. define a subset of the populated partitions of the first table that excludes at least one populated partition of the first table;
 b. create a file context, which stores at least location data for a row and a first value associated with the row, for each populated partition in the subset of the populated partitions of the first table;
 c. determine the lowest first value stored by the file contexts for the first table;
 d. identify rows with a particular first value by at least reading the file contexts of the first table; and
 e. repeat a through d until the subsets of the populated partitions of the first table have included all the populated partitions of the first table.

24. The computer program of claim 23 wherein defining a subset includes calculating a total number of file contexts for the first table and a second table.

25. The computer program of claim 23 wherein the rows of a second table are divided into partitions.

26. The computer program of claim 25 further comprising further comprising executable instructions that cause a computer to:
 a'. define a subset of populated partitions of the second table;
 b'. create a file context, which stores at least location data for a row and a first value associated with the row, for each populated partition in the subset of the populated partitions of the second table;
 c'. determine the lowest first value stored by the file contexts for the second table;
 d'. identify rows with a particular first value by at least reading the file contexts of the second table; and
 f. repeating a through e and a' through d' until the subsets of the populated partitions of the first table have included all the populated partitions of the first table and wherein e includes repeating b through d and a' through d' until the subsets of the populated partitions of the second table have included all the populated partitions of the second table.

27. The computer program of claim 23 wherein creating a file context comprises changing the location data and first value to correspond to a row in a different partition.

28. The computer program of claim 23 wherein the rows are stored in order of their corresponding first value within the partitions.

29. The computer program of claim 23 wherein the first value corresponding to a row is the result of a hash function applied to the values in one or more columns.

30. The computer program of claim 23 wherein defining a subset of the populated partitions of the first table includes:
 i. representing a total read time for a first table and the second table in terms of a variable representing the number of partitions in a subset of the partitions of the first table;
 ii. determining the rate of change in total read time in terms of the number of partitions in a subset of the first table;
 iii. truncating the number of partitions for which the rate of change in total read time is zero; and
 iv. increasing the number of partitions to one if truncation results in a value of zero.

31. The computer program of claim 23 wherein defining a subset of the populated partitions of the first table includes:
 v. if truncation results in a value greater than zero, determining whether the read cost for a subset including an additional partition is less than the read cost for the current number of partitions and increasing the number by one if the read cost with the additional partition is lower.

32. The computer program of claim 23 wherein a number, f1, of populated partitions in a subset of the partitions of the first table is determined in accordance with the equation:

$$f1=(fT*R/(1+R))$$

where fT is a total number of file contexts for a first table and the second table and $$R=\sqrt{(r2/r1)*(p1/p2)}$$

where r1 and r2 represent a cost to read once through tables 1 and 2, respectively, and p1 and p2 represent the number of populated partitions of tables 1 and 2, respectively.

33. The computer program of claim 23 wherein a number, f1, of populated partitions in a subset of the partitions of the first table is determined in accordance with the equation:

$$f1=(fT*R/(1+R))$$

where fT is a total number of file contexts for a first table and the second table and $$R=\sqrt{(db2/db1)*(p1/p2)}$$

where tables 1 and 2 require db1 and db2 data blocks of storage, respectively, and p1 and p2 represent the number of populated partitions of tables 1 and 2, respectively.

* * * * *